US006687304B1

United States Patent
Peng (10) Patent No.: US 6,687,304 B1
(45) Date of Patent: Feb. 3, 2004

(54) EFFICIENT VIDEO DATA DATA ACCESS USING FIXED RATIO COMPRESSION

(75) Inventor: Shaomin Peng, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/552,652

(22) Filed: Apr. 19, 2000

(51) Int. Cl.[7] .............................. G06K 9/36; H04B 1/66; H04N 7/12
(52) U.S. Cl. ............................ 375/240.24; 375/240.03; 382/236; 348/404.1
(58) Field of Search ...................... 375/240.01, 240.02, 375/240.03, 240.1, 240.16, 240.24; 348/421.1, 699, 404.1, 424.1; 382/236

(56) References Cited

U.S. PATENT DOCUMENTS 4,703,352 A * 10/1987 Kondo .................. 375/240.24
5,734,433 A * 3/1998 Kondo et al. ............ 375/240.24
6,125,146 A * 9/2000 Frencken et al. ........ 375/240.24
6,337,881 B1 * 1/2002 Chaddha ................. 375/240.16

FOREIGN PATENT DOCUMENTS

| EP | 0926898 A1 | 7/1998 | ............ H04N/7/26 |
| JP | 09139941 A | 5/1997 | ............ H04N/7/24 |
| WO | WO9921125 | 10/1998 | ............ G06K/9/36 |

* cited by examiner

Primary Examiner—Gims Philippe (57) ABSTRACT

A data organization and access scheme for permitting easier location of a reference macroblock during motion compensation and for providing a video output system with output data. The frames are segmented into coding blocks comprising a small number of horizontally adjunct blocks compressed to a fixed length. Within each coding block, only two quantization strategies are employed so that the start and end position of any coding block is easily ascertained as well as the location of any individual block within the coding block.

15 Claims, 10 Drawing Sheets

FIG. 1

| $c_{00}$ | $c_{01}$ | ... | $c_{0n}$ |
|---|---|---|---|
| $c_{10}$ | $c_{11}$ | ... | $c_{1n}$ |
| ⋮ | | ... | |
| $c_{m0}$ | $c_{m1}$ | ... | $c_{mn}$ |

EFFICIENT VIDEO DATA DATA ACCESS USING FIXED RATIO COMPRESSION

BACKGROUND OF THE INVENTION

1. Field of the Invention

The present invention is directed to a system for encoding digital video data wherein selection of a compression strategy and identification and retrieval of specific elements of the video frame, are efficiently accomplished. The invention has particular utility in connection with digital television decoder design that utilizes the Adaptive Dynamic Range Coding methodology.

2. Description of the Related Art

Adaptive Dynamic Range Coding (ADRC) refers to a coding technique described in U.S. Pat. No. 4,703,352 entitled "High efficiency technique for coding a digital video signal," to Kondo, the contents of which are hereby incorporated by reference into the subject application as if set forth herein in full. In accordance with this technique, the differences between successive image points are calculated and characterized according to a scale. This scale is then used to select a quantization strategy for the data, the purpose of which is to effect further compression without degrading the image. Quantization discards information which is not visually significant by dividing video data by a quantizer step size appropriate for the range of the data.

Figure 1:
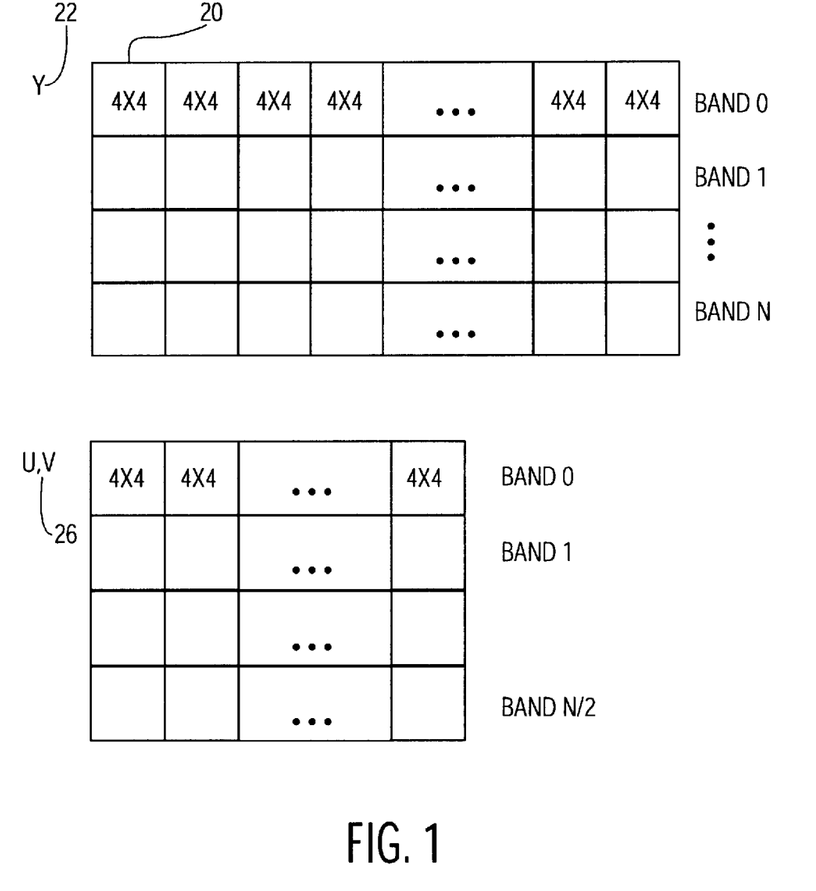
FIG. 1 is a diagram of a frame segmented into bands and blocks according to a conventional ADRC system.

The ADRC method segments each frame of a video sequence into many bands as shown in FIG. 1. Assuming each frame of video consists of 720 columns and 480 lines and the video format is 4:2:0 interlaced, then the Y field is 720×240 and the U,V fields are 360×120. Each frame has 2 fields. Each band occupies four lines of the frame including Y components 22 and, U and V components 26. Inside each band, the image is further segmented into many blocks 20 which are 4 pixels by 4 pixels or 16 pixels each.

Within each band, each block is encoded using a strategy that depends upon the dynamic range of the block, that is, the difference between the maximum and minimum values of the digital video data representing the picture elements. Blocks with smaller dynamic ranges are encoded with fewer bits, and the converse is also true, some blocks need a greater number of bits. Accordingly, each encoded block has a different bit length. However, following this encoding, the ADRC method also compresses each entire band with a fixed compression ratio. In order to achieve that ratio, all blocks within the same band trade bits with each other, making location of a particular block difficult.

Moreover, using the band as a coding unit adds a level of complexity and difficulty to the real-time decoding process, because motion compensation is based on a predictive technique, that requires being able to locate reference macroblocks within what is termed anchor frames. Using the ADRC method, calculating the location of a macroblock is not straight-forward, given that blocks within a band are not compressed with a fixed bit rate. In some cases, as many as five bands, a very large amount of data, must be searched to locate a particular macroblock. This is time-consuming and affects performance.

In addition, by providing seven different block encoding strategies, the ADRC method introduces further inefficiency. Any given band may require application of all seven encoding/decoding strategies depending on the data. Because data within a band is not compressed with a fixed bit rate, an entire band must be decoded before even a single line can be displayed.

Other patents which use the ADRC method do not address the inefficiencies of the method in the same manner as the present invention. These patents include Japanese patent publication number 09139941 A, published Feb. 27, 1997, entitled "Encoding/decoding device for picture signal" and U.S. Pat. No. 5,734,433 ('433) entitled "Picture encoding apparatus, picture encoding method, picture encoding and transmitting method, and picture record medium." The Japanese patent 09139941A pertains to the reduction of the amount of required calculations by normalizing a picture element value in a level direction by ADRC encoding in fractal encoding. The '433 patent uses a least square optimization method to determine the minimum values of the encoded data.

OBJECT AND SUMMARY OF THE INVENTION

The present invention addresses the foregoing needs by providing a system, (i.e., a method, an apparatus, and computer-executable process steps), for organization and retrieval of coded input digital video data, such that any particular segment of the data can easily be identified and retrieved. This is accomplished by two innovations. Firstly, the band is no longer the unit for encoding the digital video data. Instead, a smaller unit, a coding block, is used as the coding unit for a frame. A coding block is a small number, for example 6, 4 by 4, horizontally adjunct blocks compressed to a fixed length. Secondly, within each coding block, only two quantization strategies are employed, so that the start and end position of any coding block is easily ascertained, as well as the location of any individual block within the coding block.

It is a further object of this invention to provide a quantization selection strategy that is efficient and economical, ensuring the required compression ratio by sacrificing the quality of the frame when necessary. Moreover, the quantization selection strategy of the present invention also enhances overall encoding and decoding efficiency while producing a video output that is of a predetermined picture quality acceptable to the consumer, since only visually insignificant data is discarded. The strategy ensures that the subjective visual quality of the picture produced remains satisfactory in that it will contain no annoying artifacts.

In the present invention, the seven quantization strategies available under the ADRC method are replaced with two strategies, fine and coarse quantization. In selecting a quantization strategy, the data is first encoded using the number of bits specified by a modified dynamic range table. However, if this fine quantization strategy does not guarantee a degree of compression which will generate the needed bit transmission rate, a coarse strategy, using greater compression, and therefore fewer bits, is immediately selected.

More than one strategy is used because the dynamic range does not precisely reflect the distribution of the data. For example, the following set of data, {0, 20, 22, 21, 24, 25, 200} has a dynamic range of 200. However, most of the data is concentrated around value 22. A coarse quantization step such as 32 would guarantee the whole coding block will have a fixed compression ratio of 2. However, this would more severely degrade the image quality than a smaller quantization step such as 8. The finer quantization step would provide a more accurate result for the data range 20–25, although level 200 would need more bits. The extra needed bits can be provided from other blocks within the same coding block, that have smaller dynamic ranges.

Accordingly, the present invention uses more than one strategy to code blocks but avoids the complexity resulting from the 7 strategies provided by the ADRC method.

It is a further object of the present invention to provide a system for reducing the number of bits that must be transmitted, to represent the minimum values of a particular coding block. In one embodiment of the invention, instead of transmitting a minimum value for each block of data, which requires 8 bits in accordance with the ADRC method, the present invention utilizes a 3-bit code representing the range the minimum value falls into, and only the number of bits that are required to represent each minimum value. Because some minimum values within a given coding block may have relatively small differences due to the continuity of part of the image, these minimum values can be represented in less than 8 bits; the minimum value for many blocks is 0. So statistically, this coding system reduces the number of bits required to encode an image.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 9:
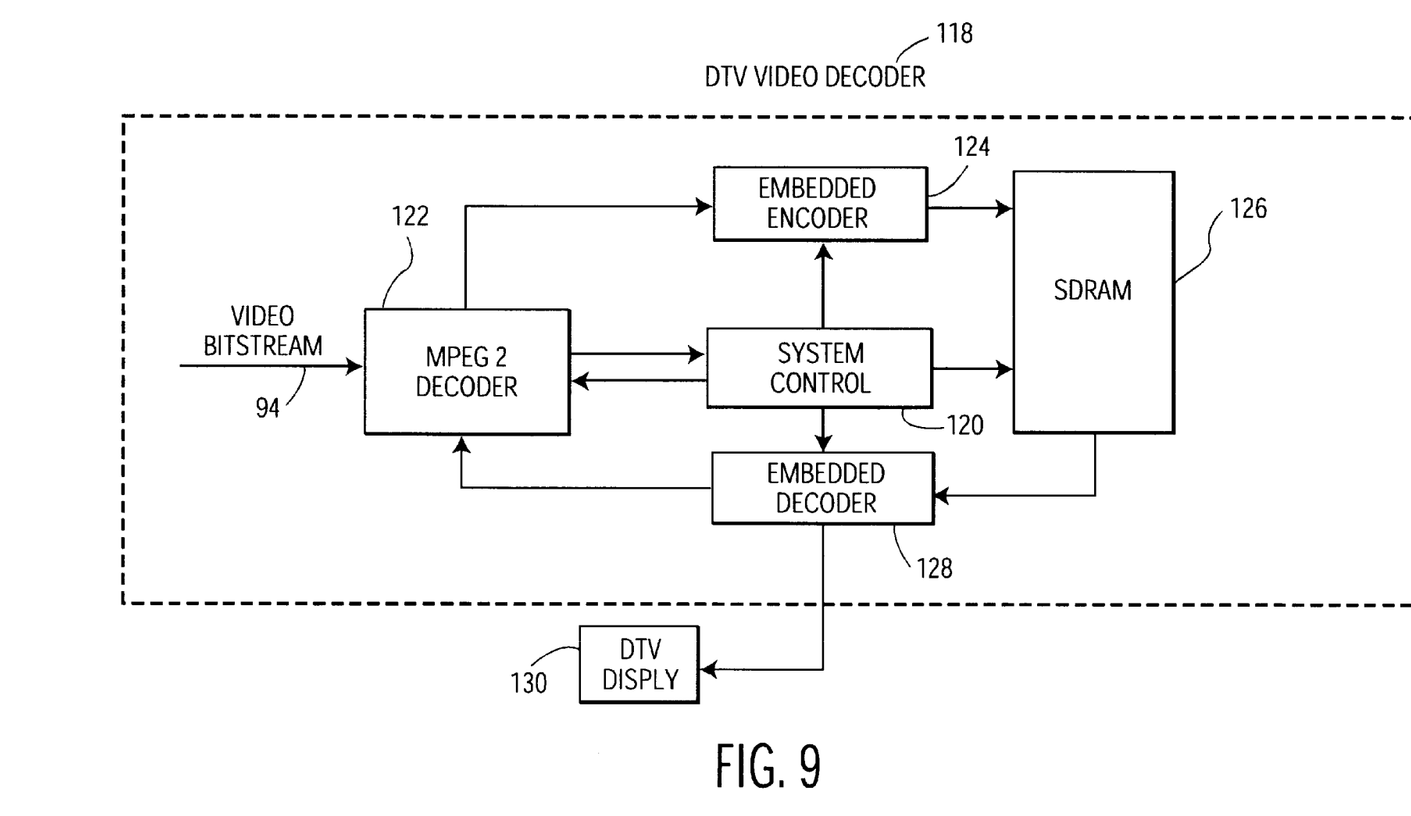
FIG. 9 depicts a system on which the present invention may be implemented.

FIG. 9 shows a representative embodiment of a system on which the present invention may be implemented. In this embodiment, the system is implemented in a DTV video decoder 118. To begin with, the video bit stream 94 is input to an MPEG 2 decoder 122. After the bitstream is decoded, the fixed rate compression scheme of the embedded encoder 124 is then applied. The compressed data is then saved in the SDRAM 126. Because the data is saved in compressed format and takes up less space than the original video data, less SDRAM memory space is needed. The saved data is generally retrieved for two reasons: firstly for output to the display 130 and secondly, when the MPEG 2 decoder 122, under the control of the system control 120, requests a motion compensation reference block. In the first instance, the embedded decoder 128 is called by the system control unit 120 to retrieve the data from the SDRAM 126 and perform decompression upon the data. After decompression, the data is output to a DTV display 130, line by line. In the second instance, the MPEG 2 decoder 122 requests specific reference blocks from the SDRAM 126 through the System control 120. These blocks are then decompressed by the embedded decoder 128 and output.

Figure 7A:
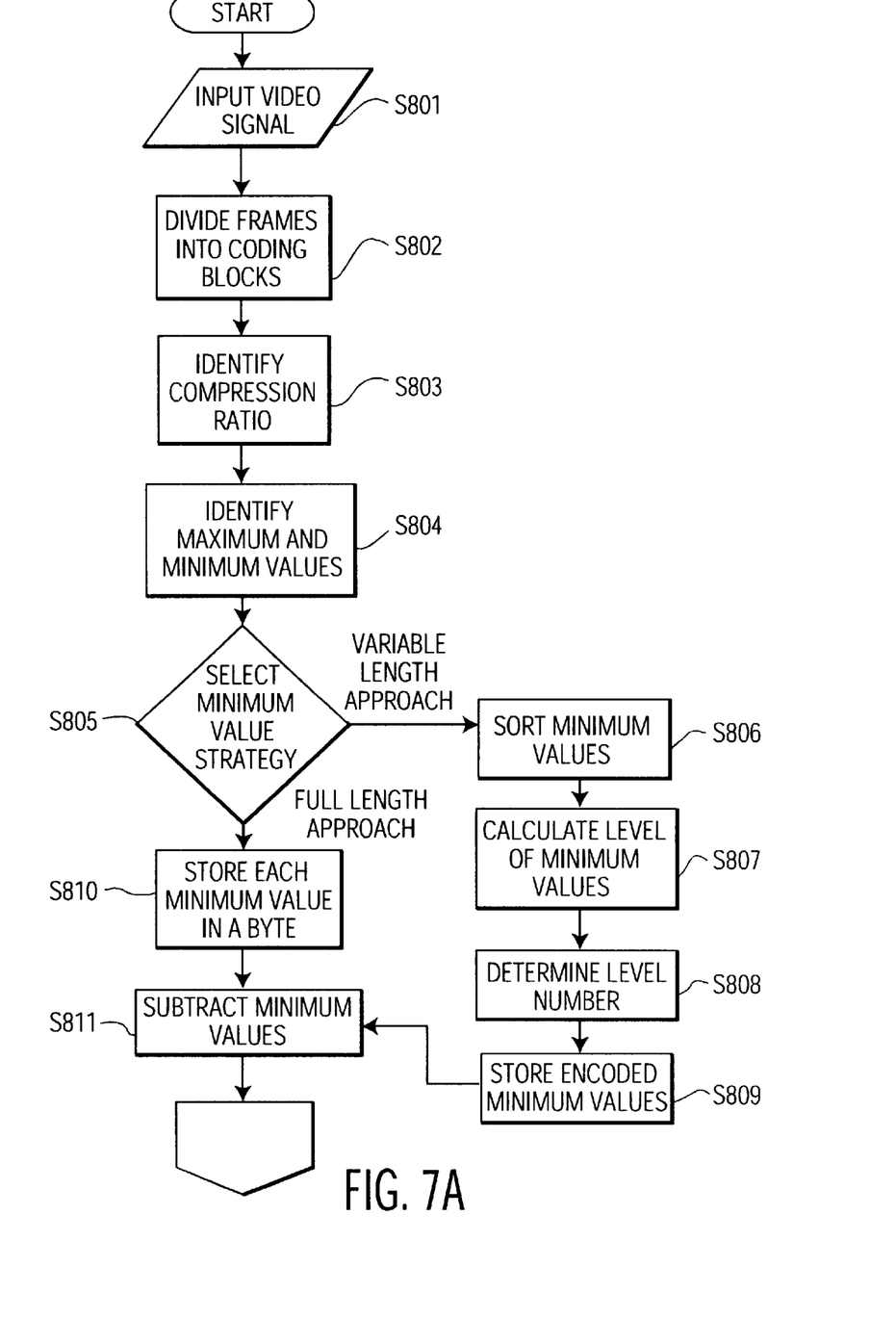
FIG. 7 is a flow diagram used for explaining the operation of the present invention.
Figure 7B:
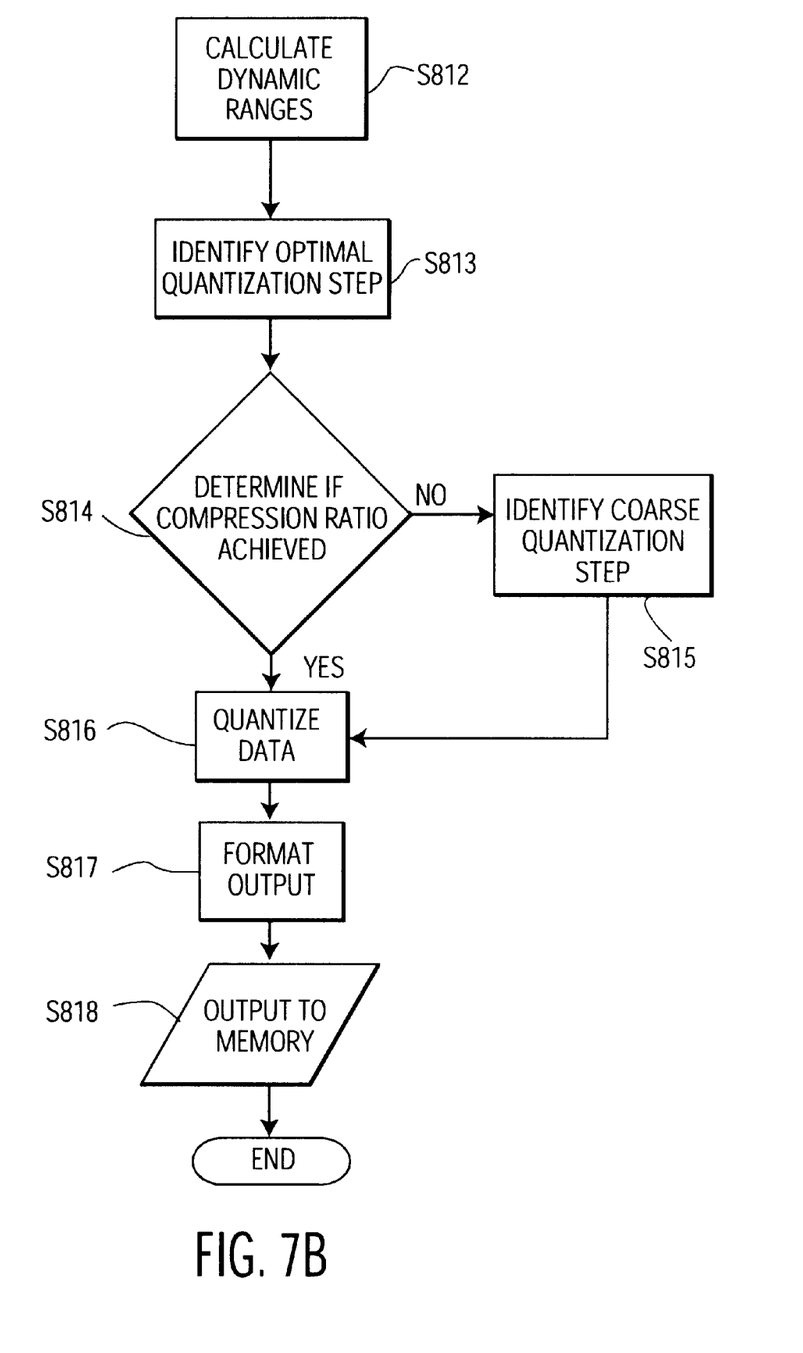
Figure 8:
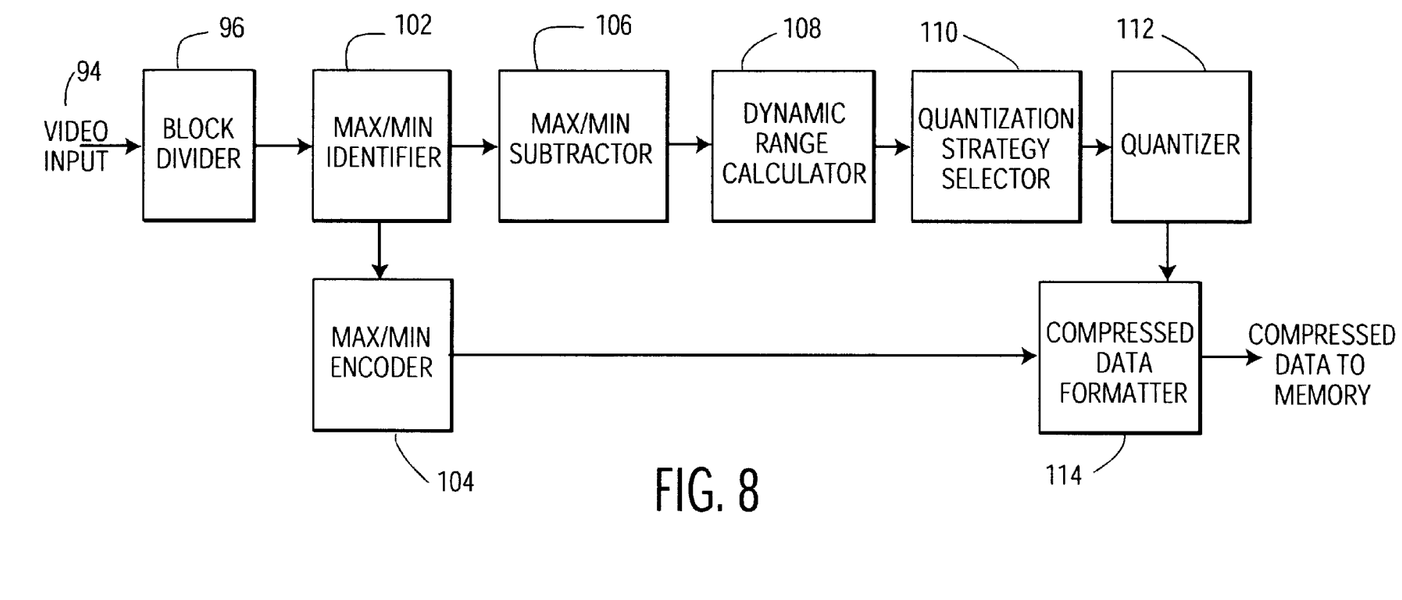
FIG. 8 is a functional block diagram showing elements of the first and second embodiments of the present invention

FIG. 8 is a block diagram depicting a video input and modules used to effect signal processing steps. This device could be modified to transmit the output signal over a radio transmitter, or via wireless means, where the signal could be embodied in a carrier wave. FIG. 7 is a flow diagram, which explains the functionality of the modules shown in FIG. 8. To begin, in step S801 original uncoded video data is input into the present invention. Video data 94 input from the video source is input into a block divider 96 which divides the frame into coding blocks S802. The coding block is the coding group for the present invention. Coding blocks are comprised of a fixed number of 4×4 miniblocks 20 as shown in FIG. 2b. For example, a coding block could be k 4×4 horizontally adjunct miniblocks, where k=6, resulting in every four lines of data consisting of M coding blocks, where M=(number of pixels line)/4 k. Using the coding block as the coding group results in a more simplified and horizontally regularized data structure, as compared with the traditional ADRC approach.

Figure 2A:
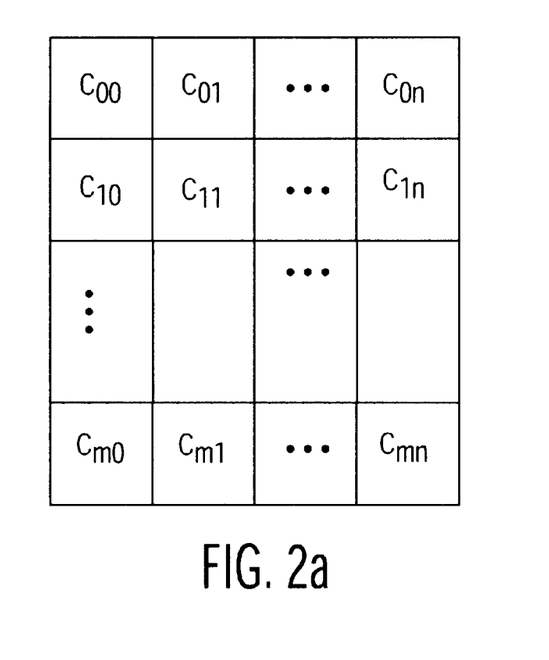
FIG. 2a is a diagram of a frame segmented into coding blocks according to the present invention.
Figure 2B:
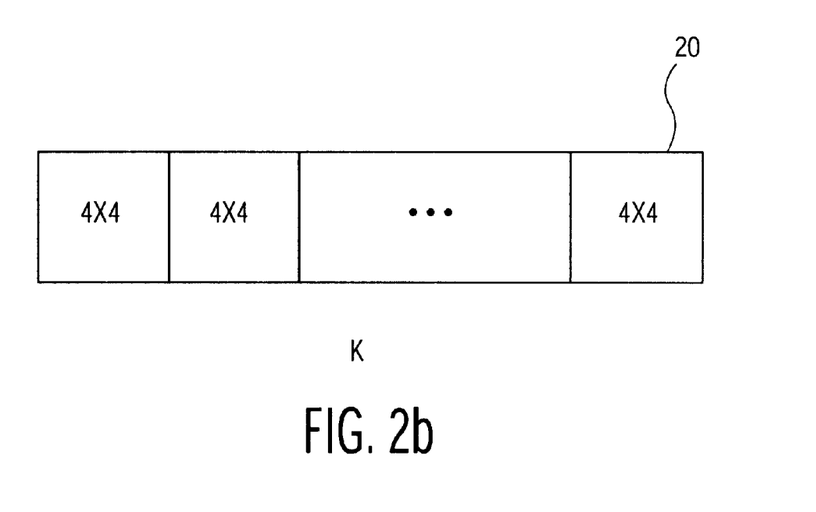
FIG. 2b is a diagram of the inside of a coding block segmented into 4×4 miniblocks according to the present invention.
Figure 3:
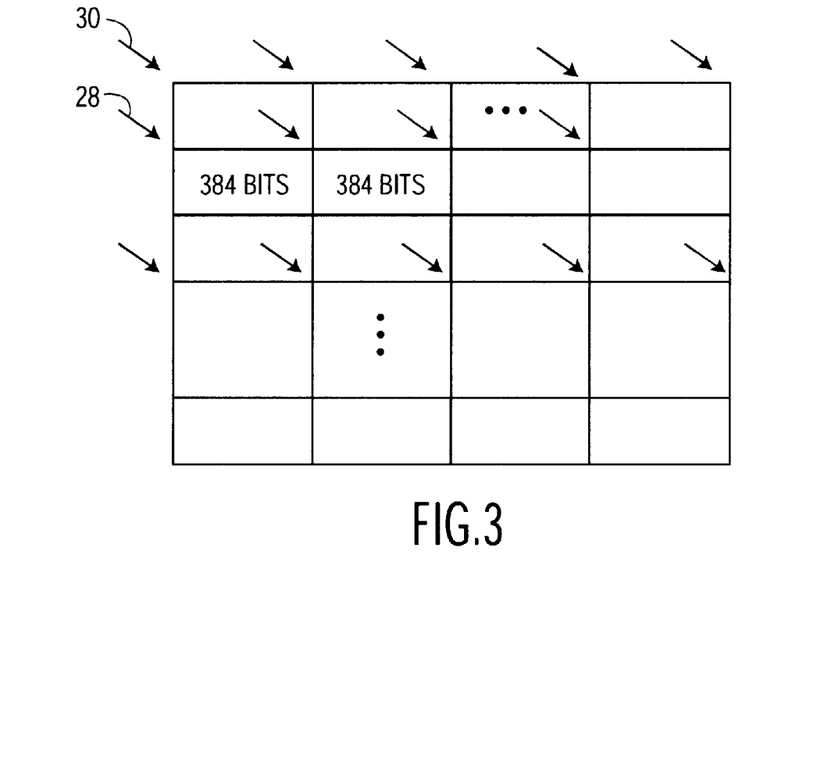
FIG. 3 is a diagram of a portion of a frame, segmented into coding blocks compressed with a compression ratio p, according to the present invention.
Figure 4:
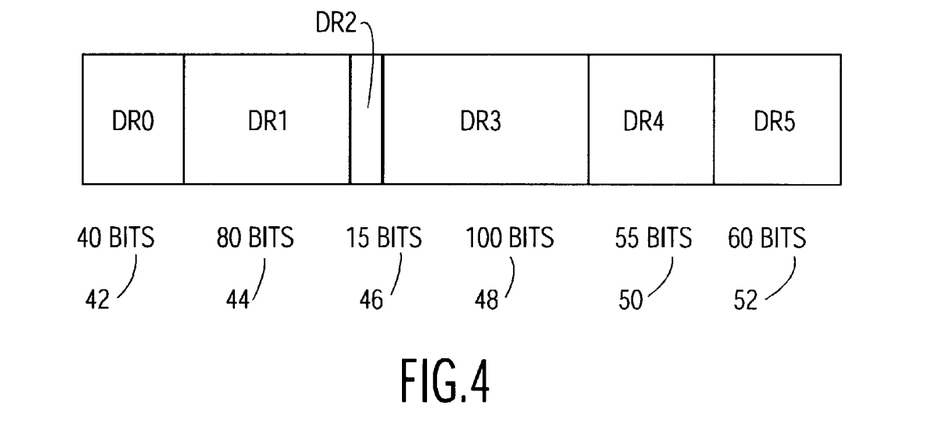
FIG. 4 is a diagram of a coding block wherein each 4×4 miniblock has a different dynamic range, and therefore a different number of bits following application of a quantization strategy.

If we assume, for example, that the coding block is 4 pixels vertically by 4 k pixels horizontally or k, 4×4 blocks horizontally, there are 24 pixels horizontally in one coding block and there are 1920/24, or 80 Y coding blocks and 40 U and 40 V coding blocks in each horizontal path of each field FIG. 2a. Because each coding block is coded independently with a fixed length, it is simple to retrieve any specific coding block by searching the starting address of each coding block directly. As shown in FIG. 3, each node 30 pointed to, is a fixed number of bits distant. For example, if each coding block is compressed by a factor p=2, the number of assigned bits for one coding block is 4×24×8/2, or 384 bits as a result of the compression FIG. 7 Step S803. Therefore, as shown in FIG. 3, to skip one coding block 28 means to skip 384 bits and the process of searching for a reference macroblock is simplified. In accordance with this example, although any of the k 4×4 miniblocks may have a different number of bits, as shown in FIG. 4 42 44 46 48 50 52, the sum of all the bits in the coding block must be equal to the same fixed number, in this example, 384 bits. If the total bits used are less than 384, dummy bits are added.

Within each coding block, the bits are compressed using a simplified and efficient adaptation of the ADRC method. To begin with, the minimum value of the digital data is determined by FIG. 8 102, the range of minimum values being 0 to 255. In accordance with FIG. 7 step S804, if k=6 and there are k miniblocks, there will be 6 minimum values identified for each coding block.

These minimum values can be stored in a number of ways as indicated in FIG. 7 step S805 by the Max/Min Encoder shown in FIG. 8 104. In one mode, FIG. 7 step S810 a full length approach is employed. This means that each minimum value is stored in a byte (8 bits). So if there are 6 miniblocks in a coding block, 48 bits will be required to store the 6 minimum values for the coding block.

Alternatively, a variable length storage approach is employed. This approach takes advantage of the fact that on average, most of the minimum values in a coding block do not require 8 bits of storage. For the best case, where all the minimum values inside a coding block are all zero or 255, only one bit of storage is required. For the worst case, the maximal memory required is 42 bits, as shown in level 4 of the table below.

The algorithm for this encoding is explained in the table below and is based upon calculating the range of the minimum values for each coding block, and storing these minimum values in encoded form, along with a level code, which indicates how to decode them.

| LEVEL | DATA | STORAGE |
|---|---|---|
| Level 1 | $X_{max} < 2^1$ | 1 bit per miniblock, |
| | $X_{min} = 255$ | k bits per coding block |
| | consider all minimum values = to 0 or 255, respectively | |
| Level 2 | $X_{max} < 2^3$ | 3 bits per miniblock, |
| | | 3k bits per coding block |
| Level 3 | $X_{max} < 2^5$ | 5 bits per miniblock, |
| | | 5k bits per coding block |
| Level 4 | $X_{max} < 2^7$ | 7 bits per miniblock, |
| | | 7k bits per coding block |
| Level 5 | $2^7 <= X_{min} < 2^7 + 2^4$, | 4 bits per miniblock, |
| | $X_i - 128 < 2^4$ | 4k bits per coding block |
| Level 6 | $2^7 <= X_{min} < 2^7 + 2^6$, | 6 bits per miniblock |
| | $X_i - 128 < 2^6$ | 6k bits per coding block |
| Level 7 | $X_{min} >= 2^7 + 2^6$, | 6 bits per miniblock |
| | $255 - X_i <= 63$ | 6k bits per coding block |

First, in accordance with FIG. 7 step 806, the minimum values in each coding block are sorted in ascending order.

Then the level of each minimum value is calculated FIG. 7 step 807.

Seven levels are established, each level corresponding to a different range of minimum values, as follows. Level 1 corresponds to the situation where the highest minimum value for the coding block is <2. In this case, the minimum values are treated as if they were zero. Level 1 also corresponds to the situation where the lowest minimum value= 255. For both of these Level 1 cases, the storage required for the minimum values is 1 bit plus 3 level bits for the entire coding block.

Level 2 corresponds to the situation where the highest minimum value for the coding block is $2^3$ and the storage required is 3 bits per miniblock. Level 3 corresponds to the situation where the highest minimum value for the coding block is less than $2^5$ and the storage required is 5 bits per miniblock. Level 4 corresponds to the situation where the highest minimum value for the coding block is less than $2^7$ and the storage required is 7 bits per miniblock. Level 5 corresponds to the situation where the lowest minimum value is between $2^7$ and $2^7+2^4$. In this case, 128 is subtracted from the range and 4 bits of storage are required per miniblock. Level 6 corresponds to the situation where the lowest minimum value is between $2^7$ and $2^7+2^6$. In this case, 128 is subtracted from the range and 6 bits are required per miniblock. Level 7 corresponds to the situation where the lowest minimum value is $>=2^7+2^6$. In this case, the lowest minimum value is subtracted from 255 and 6 bits are required per miniblock.

In all cases, there is an overhead of 3 bits which is required to store the level number. In the best case scenario, 4 bits are required to store the minimum values for a coding block, representing a storage savings of 92% over the prior art. In the worst case scenario, 45 bits are needed, representing a storage saving of 6% over the prior art. Using this method of storing minimum values will definitely save memory. Whether the full-length storage approach FIG. 7 step S810 or variable-length storage approach is used FIG. 7 steps, S806, S807, S808, and S809, the minimum values are stored and then subtracted from the digital video data by the Max/Min Subtractor FIG. 8 106 as shown in FIG. 7 step S811.

Following the subtraction of minimum values, the data is input to the Dynamic Range Calculator FIG. 8 108. In calculating the dynamic range for each miniblock FIG. 7 step S812, the ADRC dynamic range lookup table is used in a simplified manner. The ADRC table is designed to cover the full range of spatial resolution, i.e. [0, 255], using 8 sub-ranges, each having a different quantization step and therefore a different bit rate. Accordingly, only 3 bits need be stored to indicate the selected sub-range.

Unlike the ADRC method, which makes retrieval of data cumbersome and time-consuming, due to the application of 8 different quantization strategies, the current invention uses only 2 quantization strategies but still achieves the same level of consumer satisfaction FIG. 8 110. Two strategies are employed because using only one strategy could result in severe image degradation. Dynamic range is only an indication of how dynamic a block of data will be but does not indicate the concentration of the data around any particular data value. This is significant because the quantization strategy determines how coarse or fine the compressed data will be.

Figure 5:
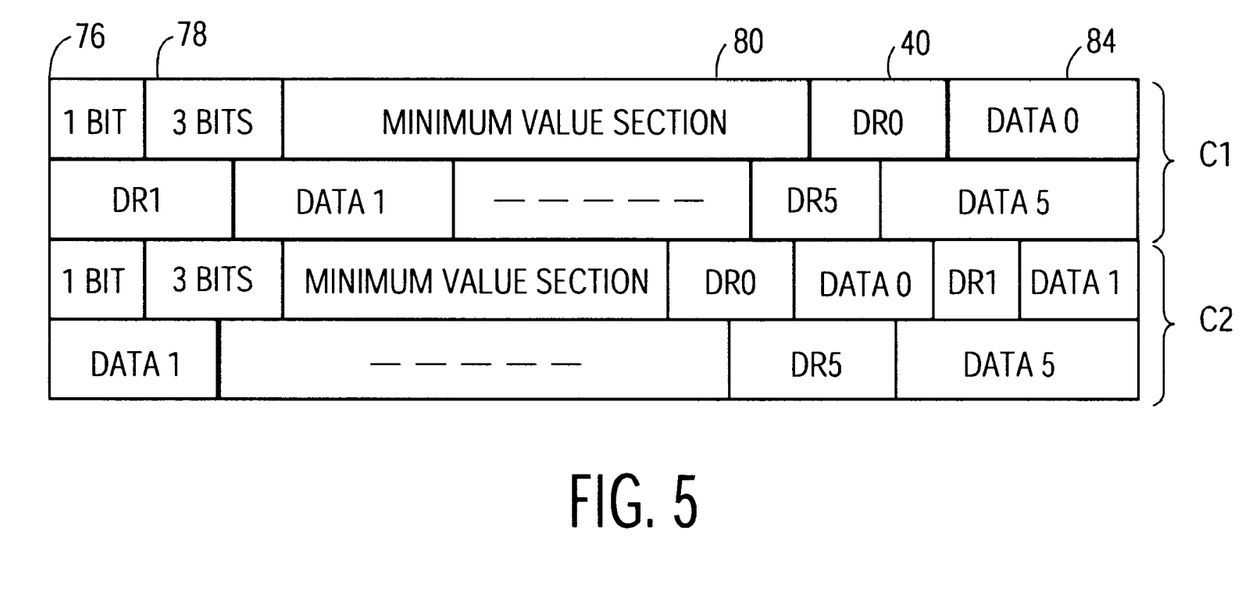
FIG. 5 is a diagram representing two encoded coding blocks according to the present invention.

The following example demonstrates the significance of data concentration. Given a set of data [0, 20, 22, 21, 24, 25, 200], the set has a dynamic range of 200 but is closely concentrated around data value 22. A single outlying value of 200 results in a dynamic range of 200 but does not reflect the nature of most of the data which is concentrated around value 22. Based on the dynamic range, a coarse quantization step such as 32 might be selected because this would guarantee that the whole coding block would have a fixed compression ratio of 2. However, selecting this coarse quantization step would degrade the quality of the compressed image more severely than a smaller quantization step such as 8. The smaller quantization step would produce a more accurate result for the data range [20, 25] but representing the data value of 200 would require more bits. The extra bits could be provided by other blocks within the same coding block that have smaller dynamic ranges, as indicated in FIG. 5. Therefore, with the goal of producing a predetermined visual quality acceptable to the consumer, without sacrificing simplicity and speed of data retrieval, the current invention identifies a first quantization strategy FIG. 7 step S813 which will provide fine quantization for each individual miniblock but if it is determined that the needed compression ratio for the coding block cannot be achieved FIG. 7 step S814, a coarser strategy is selected which guarantees the needed bit rate FIG. 7 step S815.

Following selection of the quantization strategy, the next step is to quantize the data FIG. 7 S816. Once processed by the quantizer FIG. 8 112, the data is formatted FIG. 7 S817 by the compressed data formatter FIG. 8 114. FIG. 5 shows the coding block data structure. The first bit FIG. 5 76 is used for storing the coding strategy representing the quantization strategy selected. The next 3 bits FIG. 5 78 are used for storing the minimum value overhead which represents the minimum value level selected when the variable length approach is utilized. The next section of the data structure FIG. 5 80 is used for storing the minimum values. These may be in full length or in coded form if the variable length approach has been selected. The next 3 bits represent dynamic range information FIG. 5 40 for miniblock 0. The quantized data follows FIG. 5 84 and will vary in length depending on the nature of the data and the quantization strategy selected. Dynamic range information and quantized data appear for each miniblock within the coding block. Accordingly, for any given coding block, the total number of bits of storage required, given a coding block comprised of k miniblocks, can be represented by the following formula: Total bits=1+3+Σminimum value bits+3 k +Σdata bits. FIG. 5 represents the case where k=6.

Figure 6A:
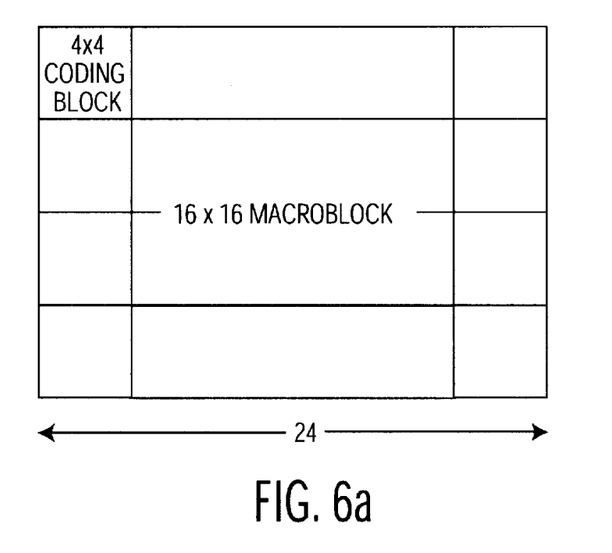
FIG. 6a is a diagram showing how a macroblock is retrieved according to the present invention, illustrating the best case scenario where the macroblock is size 16×16, the coding block size is 4×24, and the macroblock falls within 4 coding blocks.
Figure 6B:
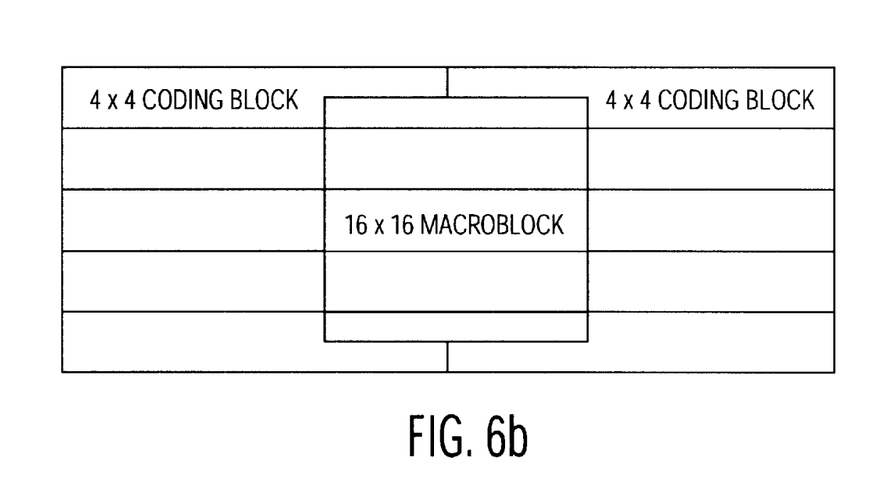
FIG. 6b is a diagram showing how a macroblock is retrieved according to the present invention, illustrating the worst case scenario where the macroblock is size 16×16, the coding block size is 4×24, and the macroblock is centered between the boundaries of ten coding blocks.
Figure 6C:
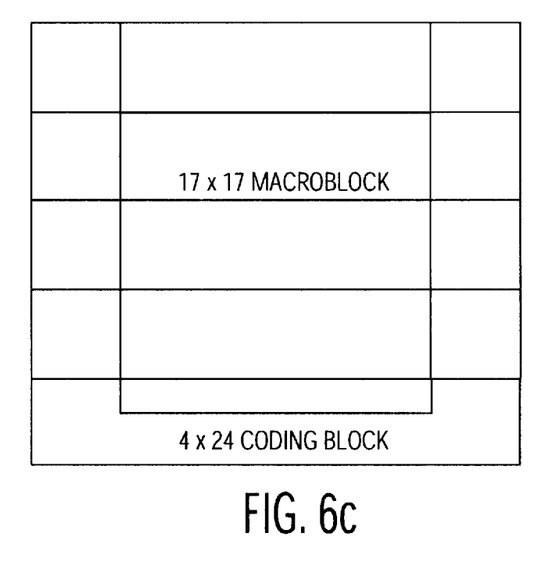
FIG. 6c is a diagram showing how a macroblock is retrieved according to the present invention, illustrating the best case scenario where the macroblock is size 17×17, the coding block size is 4×24, and the macroblock falls within 5 coding blocks.
Figure 6D:
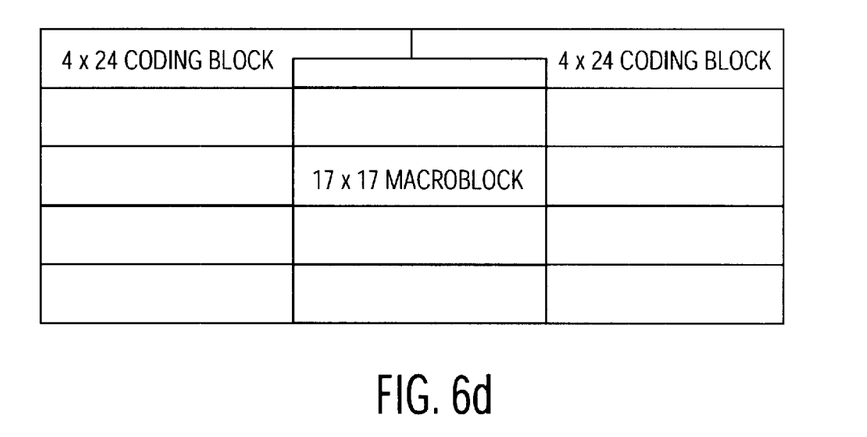
FIG. 6d is a diagram showing how a macroblock is retrieved according to the present invention, illustrating the worst case scenario where the macroblock is size 17×17, the coding block size is 4×24, and the macroblock is centered between the boundaries of ten coding blocks.

This horizontally regularized data structure facilitates easy retrieval of information. This is important for two reasons: 1) so that compressed video data can be quickly decoded and output and 2) so that particular reference blocks can be quickly retrieved and motion compensation can be efficiently calculated. For the worst case scenario, using as an example, a macroblock of size 16×16 and a coding block of size 4×24, it would be necessary to retrieve 10 coding blocks and decompress them in order to locate the desired coding block, which would mean retrieving all the coding blocks in between, both horizontally and vertically. This situation would occur when a macro block is positioned centered between the boundaries of ten coding blocks FIG. 6b. For the best case scenario, the macro block is within four coding blocks FIG. 6a. Given the regularized data structure, it is easy to find out which coding block the macro block starts in, and which coding block it ends in, because the sizes of both the macro block and the coding block are known.

As a result of the regularized data structure, any 4×4 miniblock inside a coding block can be retrieved without decoding the whole coding block. This is accomplished by computing the exact starting address of the coding block, the number of bits each 4×4 block used, and all the overhead bits. Because coding blocks are small, and the computations required are only addition and subtraction, it is not complex to retrieve any particular block.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed is:

1. A method of coding digital video data comprised of one or more frames, the method comprising:

dividing each frame into adjunct coding blocks compressed to a fixed length, each coding block being coded independently and including a fixed number of miniblocks having a respective value of bits that is variable, with a sum of a total number of bits of all the miniblocks being equal to the fixed length of the coding block;

identifying a maximum and a minimum value for each of the miniblocks in each coding block;

calculating a dynamic range for each miniblock within each coding block by subtracting the minimum value from the maximum value for each miniblock within each coding block;

quantizing each miniblock in accordance with a selected quantization strategy such that each coding block is encoded with a fixed compression ratio, the number of bits in each coding block is less than the original number, and the start and end of each coding block can be readily ascertained; and outputting the compressed coding blocks comprising the minimum value data, the dynamic range data, and the encoded compressed video data.

2. A method according to claim 1, wherein calculating the dynamic range further includes the steps of:

dividing each dynamic range into a plurality of sub-ranges, each sub-range corresponding to a unique quantization step; and associating each sub-range with an identifier.

3. A method according to claim 2, wherein quantizing each miniblock further includes the steps of:

selecting the sub-range and a first corresponding quantization strategy which corresponds to the dynamic range of each miniblock; and identifying a second, coarser quantization strategy for each miniblock, which will provide a required compression ratio and a picture which, when decoded, will exhibit a predetermined picture quality.

4. A method according to claim 3, further including the steps of:

selecting the first quantization strategy when it will provide the required compression ratio; and selecting the second quantization strategy when the first quantization strategy has not been selected.

5. A method according to claim 4, further including the steps of:

sorting the coding block minimum values from lowest to highest value;

identifying a level corresponding to the minimum values, for each coding block, from a set of predetermined levels;

associating an identifier with each level;

storing the minimum values as bit patterns of varying length; and wherein the minimum values can be reconstructed by combining each identifier with each bit pattern representing the minimum value.

6. An apparatus for coding video data input comprised of one or more frames, the apparatus comprising:

a block dividing portion for dividing the input video signal into adjunct coding blocks compressed to a fixed length, each coding block being coded independently and including a fixed number of miniblocks having a respective value of bits that is variable, with a sum of a total number of bits of all the miniblocks being equal to the fixed length of the coding block;

a maximum/minimum identifying portion for identifying a maximum and a minimum value for each of the miniblocks in each coding block;

a dynamic range calculating portion for calculating a dynamic range for each miniblock based upon the maximum and minimum values;

a quantizing portion for quantizing each miniblock with a selected quantization strategy such that each coding block is encoded with a fixed compression ratio, the number of bits in each coding block is less than the original number, and the start and end of each coding block can be readily ascertained; and an outputting means for outputting the compressed coding blocks comprising minimum value data, dynamic range data, and the compressed video data.

7. An apparatus as in claim 6, further including a quantization strategy selecting portion for 1) identifying a first fine quantization strategy for each miniblock, corresponding to the dynamic range of the miniblock, b) identifying a second coarser quantization strategy for each miniblock, which provides greater compression than the first quantization strategy, and which will provide a required bit transmission rate and a picture which, when decoded, will exhibit a predetermined picture quality, and c) selecting the second quantization strategy when the first quantization strategy will not provide the required compression ratio.

8. An apparatus according to claim 7, further including a minimum value level calculating portion for comparing the minimum values with a set of predetermined levels and identifying the corresponding level for each coding block; an associating portion for associating the calculated minimum value level with an identifier; and a minimum value storing portion wherein minimum values are stored as bit patterns of varying length; wherein the minimum values can be reconstructed by combining the identifier with the bit pattern representing the minimum value.

9. Computer-executable process steps to code digital video data comprised of one or more frames, the computer-executable process steps being stored on a computer-readable medium and comprising:

dividing each frame into miniblocks of adjacent vertical and horizontal bits;

grouping a fixed number of the miniblocks into coding blocks of fixed length, wherein each miniblock having a respective value of bits that is variable, with a sum of a total number of bits of all the miniblocks being equal to the fixed length each of the respective coding blocks;

identifying a fixed compression ratio for each coding block, such that the number of bits in each coding block is less than the original number, and the start and end of each coding block can be readily ascertained;

identifying a maximum and a minimum value for each of the miniblocks in each coding block;

calculating a dynamic range for each miniblock by subtracting the minimum value from the maximum value for each miniblock within each coding block;

dividing the dynamic range into a plurality of sub-ranges, each sub-range corresponding to a unique quantization strategy;

associating each sub-range with an identifier;

selecting the sub-range and a first quantization strategy which corresponds to the dynamic range of the miniblock;

identifying a second quantization strategy which will provide the compression ratio and a picture which, when decoded, will be of a predetermined picture quality;

selecting the second quantization strategy when the first quantization strategy, associated with the selected sub-range, will not provide the required compression ratio;

quantizing each miniblock in accordance with the selected quantization strategy; and outputting the compressed video data.

10. A signal, embodied in a carrier wave, representing digital video data comprising frames of units of adjacent vertical and horizontal bytes, grouped into a fixed number of coding blocks of fixed length, each of the coding block comprised of a plurality of miniblocks having a respective value of bits that is variable, with a sum of a total number of bits of all the miniblocks being equal to the fixed length of the coding block;

each coding block encoded with a fixed compression ratio such that the number of bits in each coding block is less than the original uncompressed number, and the start and end of each coding block can be readily ascertained, each unit having an identified maximum and minimum value, each coding block having a dynamic range calculated by subtracting the minimum value from the maximum value for each unit within the coding block, each dynamic range being divided into a plurality of sub-ranges, each sub-range corresponding to an unique quantization strategy and associated with an identifier, a first sub-range being selected in accordance with the dynamic range of the unit and being replaced by a second sub-range which will provide the required compression ratio when the first sub-range cannot do so, and the selected quantization strategy being applied to quantize the data.

11. A signal in accordance with claim 10 wherein the range of minimum values for each coding block are sorted from lowest to highest value; and wherein a minimum value level is calculated for each coding block; and wherein an identifier for each level is associated with each coding block; and the minimum values are stored as bit patterns of varying length; and wherein the minimum values can be reconstructed by combining the identifier with the bit pattern representing the minimum value.

12. An apparatus for coding video data input comprised of one or more frames, the apparatus comprising:

means for dividing the input video signal into coding blocks of fixed length, each coding block being further comprised of a fixed number of miniblocks having a respective value of bits that is variable, with a sum of a total number of bits of all the miniblocks being equal to the fixed length of the coding block;

means for identifying a maximum and a minimum value for each of the miniblocks in each coding block;

means for calculating a dynamic range for each miniblock based upon the maximum and minimum values;

means for quantizing each miniblock with a selected quantization strategy such that each coding block is encoded with a fixed compression ratio, the number of bits in each coding block is less than the original number, and the start and end of each coding block can be readily ascertained; and means for outputting the compressed coding blocks comprising minimum value data, dynamic range data, and the compressed video data.

13. An apparatus as in claim 12, further including means for a) identifying a first fine quantization strategy for each miniblock, corresponding to the dynamic range of the miniblock, b) identifying a second coarser quantization strategy for each miniblock, which provides greater compression than the first quantization strategy, and which will provide a required bit transmission rate and a picture which, when decoded, will exhibit a predetermined picture quality, and c) selecting the second quantization strategy when the first quantization strategy will not provide the required compression ratio.

14. An apparatus according to claim 13, further including means for calculating a minimum value level by comparing each minimum value with a set of predetermined levels; means for associating the calculated minimum value level with an identifier; and means for storing minimum values as bit patterns of varying length; wherein the minimum values can be reconstructed by combining the identifier with the bit pattern representing the minimum value.

15. A method of coding digital video data comprised of one or more frames, the method comprising;

dividing each frame into coding units, each of the coding units further comprising a plurality of miniblocks having a respective value of bits that is variable, with a sum of a total number of bits of all the miniblocks being equal to the fixed length of each respective coding unit;

identifying a maximum and a minimum value for each of the coding units;

calculating a dynamic range for each coding unit by subtracting the minimum value from the maximum value for each coding unit;

dividing each dynamic range into a plurality of sub-ranges, each sub-range corresponding to a unique quantization step;

associating each sub-range with an identifier;

selecting the sub-range and a first corresponding quantization strategy which corresponds to the dynamic range of each coding unit;

identifying a second, coarser quantization strategy for each coding unit, which will provide a required compression ratio and a picture which, when decoded, will exhibit a predetermined picture quality;

quantizing each coding unit in accordance with a selected quantization strategy such that each coding unit is encoded with a fixed compression ratio, the number of bits in each coding unit is less than the original number, and the start and end of each coding unit can be readily ascertained; and outputting the compressed coding units comprising the minimum value data, the dynamic range data, and the encoded compressed video data.

* * * * *